United States Patent
Allen, Jr. et al.

(10) Patent No.: US 8,179,257 B2
(45) Date of Patent: May 15, 2012

(54) WARNING OF HAZARDOUS CONDITIONS IN MONITORED SPACES USING RFID TECHNOLOGY

(75) Inventors: Lloyd W. Allen, Jr., Cary, NC (US); Jana Helton Jenkins, Raleigh, NC (US); Steven Michael Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 11/393,315

(22) Filed: Mar. 30, 2006

(65) Prior Publication Data

US 2007/0236352 A1 Oct. 11, 2007

(51) Int. Cl.
*G08B 13/14* (2006.01)
(52) U.S. Cl. ............... 340/572.1; 340/5.92; 701/301; 705/22
(58) Field of Classification Search .............. 340/5.92, 340/988, 825.36, 825.49, 572.1; 701/301, 701/50, 213; 705/22; 342/357.07
See application file for complete search history.

(56) References Cited

U.S. PATENT DOCUMENTS

| | | | |
|---|---|---|---|
| 2001/0040512 A1* | 11/2001 | Hines et al. | 340/825.49 |
| 2003/0085811 A1 | 5/2003 | Fitzpatrick | |
| 2004/0100380 A1* | 5/2004 | Lindsay et al. | 340/540 |
| 2004/0104817 A1* | 6/2004 | Wijk | 340/505 |
| 2004/0201479 A1* | 10/2004 | Garber et al. | 340/572.1 |
| 2005/0016277 A1 | 1/2005 | Takeuchi et al. | |
| 2005/0107934 A1* | 5/2005 | Gudat et al. | 701/50 |
| 2005/0275513 A1 | 12/2005 | Grisham et al. | |

* cited by examiner

*Primary Examiner* — Brent Swarthout
(74) *Attorney, Agent, or Firm* — Steven M. Greenberg, Esq.; Carey, Rodriguez, Greenberg & O'Keefe

(57) ABSTRACT

To warn of hazardous conditions in a monitored space, the presence of an object bearing an RFID tag is detected using an RFID tag reader. Objects may be, for example, human beings, vehicles, or stationary materiel. A determination is made as to whether the object poses a hazard by, for example, reading data from the RFID tag or by accessing a database using data read from the RFID tag. If the object is determined to pose a hazard, the nature of the hazard is determined from the RFID tag or the database, and warning about the nature of the hazard is provided proximate to the monitored space. In some embodiments, providing the warning may be conditional upon detecting the concurrent presence of two objects in the monitored space.

2 Claims, 3 Drawing Sheets

WARNING OF HAZARDOUS CONDITIONS IN MONITORED SPACES USING RFID TECHNOLOGY

BACKGROUND OF THE INVENTION

The present invention relates to the field of monitoring technology, and more particularly to using radio frequency identification (RFID) technology to warn of hazardous conditions occurring in monitored spaces.

As office and factory spaces become more densely inhabited, safety becomes an increasingly important concern. For example, in an office space having rows of cubicles, two people traveling on perpendicular trajectories through corridors may collide at a blind intersection. The result may be spilled coffee and the attendant burns, dropped laptop computers, and the like. In a similar manner, two forklifts may collide in a factory environment, a person may round a corner only to collide with an oncoming forklift or a stationary pallet of materiel awaiting shipment or have a close encounter with a container of toxic substance, and so forth.

Thus there is a need for systems, methods, and computer program products that warn of hazardous conditions in monitored spaces such as, for example, blind intersections of corridors.

SUMMARY

Aspects of the invention include methods, systems, and computer program products for warning of hazardous conditions in monitored spaces such as, for example, blind intersections in factories and office buildings. The presence in a monitored space of a first object bearing a first RFID tag is detected using an RFID tag reader. Objects may be, for example, human beings, vehicles, or stationary materiel, and more generally may be anything that might pose a hazard. A determination is made as to whether the first object poses a hazard by, for example, reading data from the first RFID tag or by accessing a database using data read from the first RFID tag. If the first object is determined to pose a hazard, the nature of the hazard is determined and a warning about the nature of the hazard is provided proximate to the monitored space. In some embodiments, providing the warning may be conditional upon detecting the presence of a second object having a second RFID tag in the monitored space concurrent with presence of the first object in the monitored space.

BRIEF DESCRIPTION OF THE SEVERAL VIEWS OF THE DRAWINGS

The invention will now be described by way of examples, with reference to the drawings in which.

DETAILED DESCRIPTION

Figure 1:
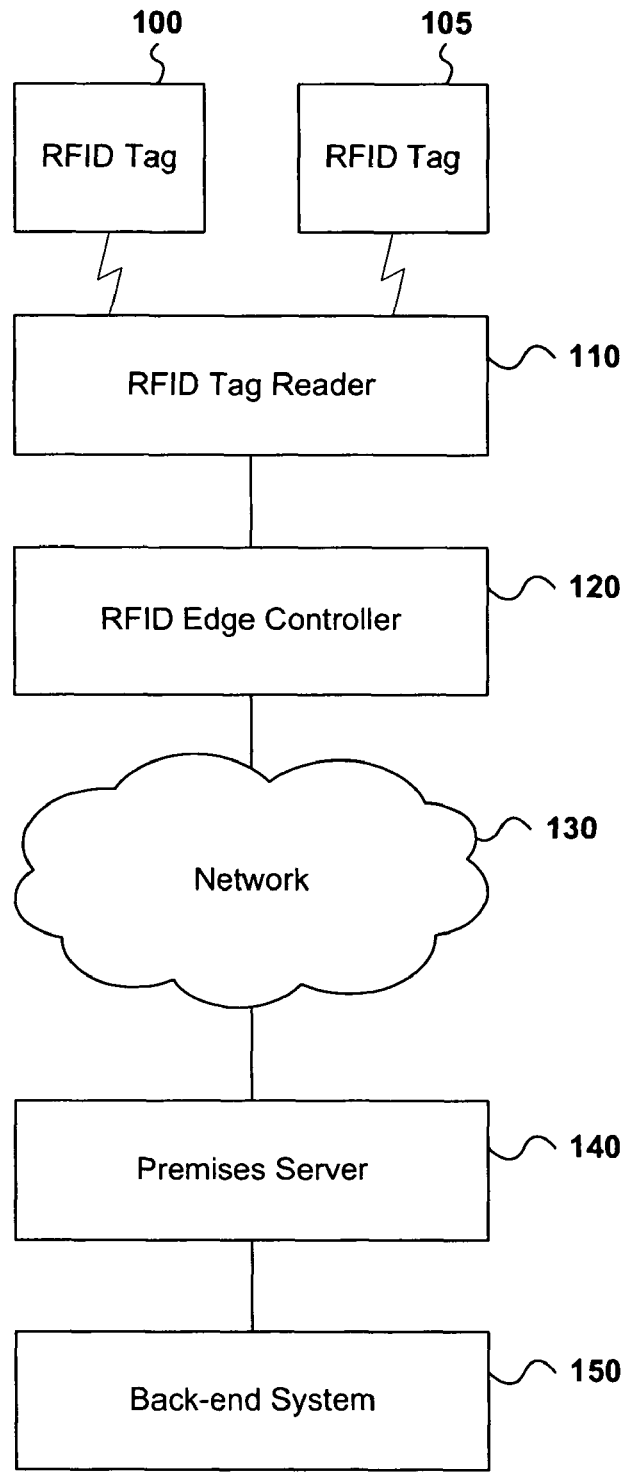
FIG. 1 is a block diagram of an exemplary RFID system suitable for application of embodiments of the invention.

The present invention will now be described more fully hereinafter, with reference to the accompanying drawings, in which illustrative embodiments of the invention are shown. Throughout the drawings, like numbers refer to like elements.

The invention may, however, be embodied in many different forms, and should not be construed as limited to the embodiments set forth herein; rather, these embodiments are provided so that the disclosure will be thorough and complete, and will fully convey the scope of the invention to those skilled in the art.

As will be appreciated by one of skill in the art, the present invention may be embodied as a method, system, or computer program product. Accordingly, the present invention may take the form of an embodiment entirely in hardware, entirely in software, or in a combination of aspects in hardware and software referred to as circuits and modules.

Furthermore, the present invention may take the form of a computer program product on a computer-usable storage medium having computer-usable program code embodied in the medium. Any suitable computer-readable medium may be utilized, including hard disks, CD-ROMs, optical storage devices, magnetic storage devices, and transmission media such as those supporting the Internet or an intranet.

Computer program code for carrying out operations of the present invention may be written in an object oriented programming language such as Java, Smalltalk, or C++. However, the computer program code for carrying out operations of the present invention may also be written in conventional procedural programming languages, such as the C programming language. The program code may execute entirely on the user's computer, partly on the user's computer, as a stand-alone software package, partly on the user's computer and partly on a remote computer, or entirely on a remote computer. The remote computer may be connected to the user's computer through a local area network or a wide area network, or the connection may be made to an external computer, for example through the Internet using an Internet Service Provider.

The present invention is described below with reference to flowchart illustrations and/or block diagrams of methods, apparatus (systems), and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions or acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions and/or acts specified in the flowchart and/or block diagram block or blocks.

One purpose of the invention is to provide warnings of hazardous conditions in monitored spaces such as, for example, blind intersections in factories or office buildings. This is done using RFID tags and an RFID tag reader. The RFID tag reader may be part of an RFID system that is used for other purposes as well. For example, some embodiments of the present invention may be implemented using RFID systems whose principal purpose is to track items for other reasons. Other embodiments of the invention may utilize a plurality of RFID tag readers, as described below. Thus, the invention is limited neither to the use of a special purpose system nor to the use of a single RFID tag reader, although some embodiments of the invention may indeed be so constructed.

The term "object" is used here in a broad sense. Objects may be, for example, human beings, vehicles, or stationary materiel, and more generally may be anything that might pose a hazard and is capable of bearing an RFID tag. Vehicles may be, for example, forklifts, cargo "mules," scooters, carts such as mail carts, workmen's carts, manufacturing carts, and the like. Stationary materiel may be, for example, pallets, wired bales, shipping containers, dumpsters, hazardous material containers, and the like.

A determination is made as to whether an object poses a hazard by, for example, reading data from an associated RFID tag or by accessing a database using data read from the RFID tag. The RFID tag may be, for example, embedded into an employee badge used for more general identification purposes, or affixed to a vehicle or container for more general tracking purposes, or otherwise associated with the object.

If the object is found to pose a hazard, the nature of the hazard is determined and a warning about the nature of the hazard is provided proximate to the monitored space. In some embodiments, providing the warning may be conditional upon the concurrent presence of a second object in the monitored space. In any case, the warning may include, for example, information about the type of hazard or its potency, the exact or approximate location of the hazard, and so forth.

Herein, the term "warning" is used in a broad sense. A warning may be, for example, visual, auditory, or tactile. Auditory warnings may be provided by sirens, beeping tones, verbal descriptions broadcast by loudspeakers, and the like. Visual warnings may be provided by monochrome or multi-colored lights, strobes, and so forth, as well as by displays that convey more detailed information regarding the nature of hazards, such as, for example, textual descriptions or graphical representations. Tactile warnings may be provided by vibrators intended to be carried in pockets, and the like. For the purpose of interpreting this specification and its attendant claims, the term "warning" is also intended to encompass propagated signals that control the actuation of visual, auditory, or tactile devices for the purpose of conveying warnings. Such signals may include, for example, wireless signals that control the actuation of elements of devices carried or worn by people, such as, for example, elements of cellular telephones or pagers such as ringers or vibrators, as well as signals that control special purpose devices.

The expression "proximate to the monitored space" means, for example, that the warning can be observed by a person or other object entering the monitored space, or about to enter the monitored space. For example, a visual warning device may be placed so that it can be observed by a person about to encounter a blind intersection of corridors; an auditory alarm may be placed so it can be heard by such a person.

FIG. 1 shows an exemplary RFID system suitable for application of the invention. RFID tags 100 and 105 may be read by an RFID tag reader 110. Although FIG. 1 shows a single RFID tag reader 110 for descriptive clarity, other embodiments of the invention may use a plurality of RFID tag readers. For example, a first set of RFID tag readers may monitor north-south traffic near a blind intersection of corridors, and a second set may monitor east-west traffic.

A conventional RFID tag such as RFID tag 100 comprises a transceiver, a power converter, and a tag antenna. As is well known to those skilled in the art, a passive RFID tag receives electromagnetic energy through the tag antenna when read or queried by the tag reader 110. The power converter, which may be, for example, a rectifier and a simple filter such as a capacitor, transforms the received energy into a form suitable to power the transceiver, in order that the transceiver may respond to the tag reader. In contrast to passive RFID tags, active RFID tags may include an internal power source such as a small battery, which eliminates the need to power the transceiver from energy received by the tag antenna. The invention applies to both passive and active RFID tags.

RFID tags may store ancillary data to be read by the RFID tag reader 110 as well as identification numbers. In one embodiment of the invention, the ancillary data may be encoded to identify the nature of a potential hazard posed by the object with which the RFID tag is associated. For example, the ancillary data may identify the object as a person, or a forklift, or a container of hazardous material.

The RFID tag reader 110 may be operably connected to an RFID edge controller 120. For example, the RFID edge controller 120 may include IBM WebSphere™ Embedded Software with IBM RFID Enablement. The RFID edge controller 120 may filter tag reads, apply some logical processing to the read tag data, and pass the tag data or information derived from the tag data to a premises server 140.

In FIG. 1, the RFID edge controller 120 and the premises server 140 are connected by a network 130. The network 130 may be, for example, the Internet, an intranet, or a local-area or wide-area network of any kind, including direct connection or operational integration. The use of a network is not, however, a necessary condition of the invention.

The premises server 140 may process tag data or other data received from the RFID edge controller 120, convert tag data, store and retrieve tag data and other data resident in a database (not shown explicitly), and exchange information with a back-end system 150 such as a warehouse management system, which may include the database. However, having an individual and distinct RFID edge controller and premises server as shown in FIG. 1 is not a necessary element of the invention. For example, the functions of the premises server 140 may be otherwise distributed, and the RFID edge controller 120, if it is present, may have access to the back-end system 150 or the database more directly or through other apparatus not shown in FIG. 1.

As mentioned above, data regarding the nature of a hazard may be read directly from an RFID tag. In other embodiments, data regarding the nature of hazards may be stored in a database or other repository in the edge controller 120, premises server 140, back-end system 150, or elsewhere. In these embodiments, the potential hazard may be detected and identified by reading the RFID tag, and the nature of the hazard may then be read from the database or other repository, using the identity of the hazard to access the database.

Figure 2:
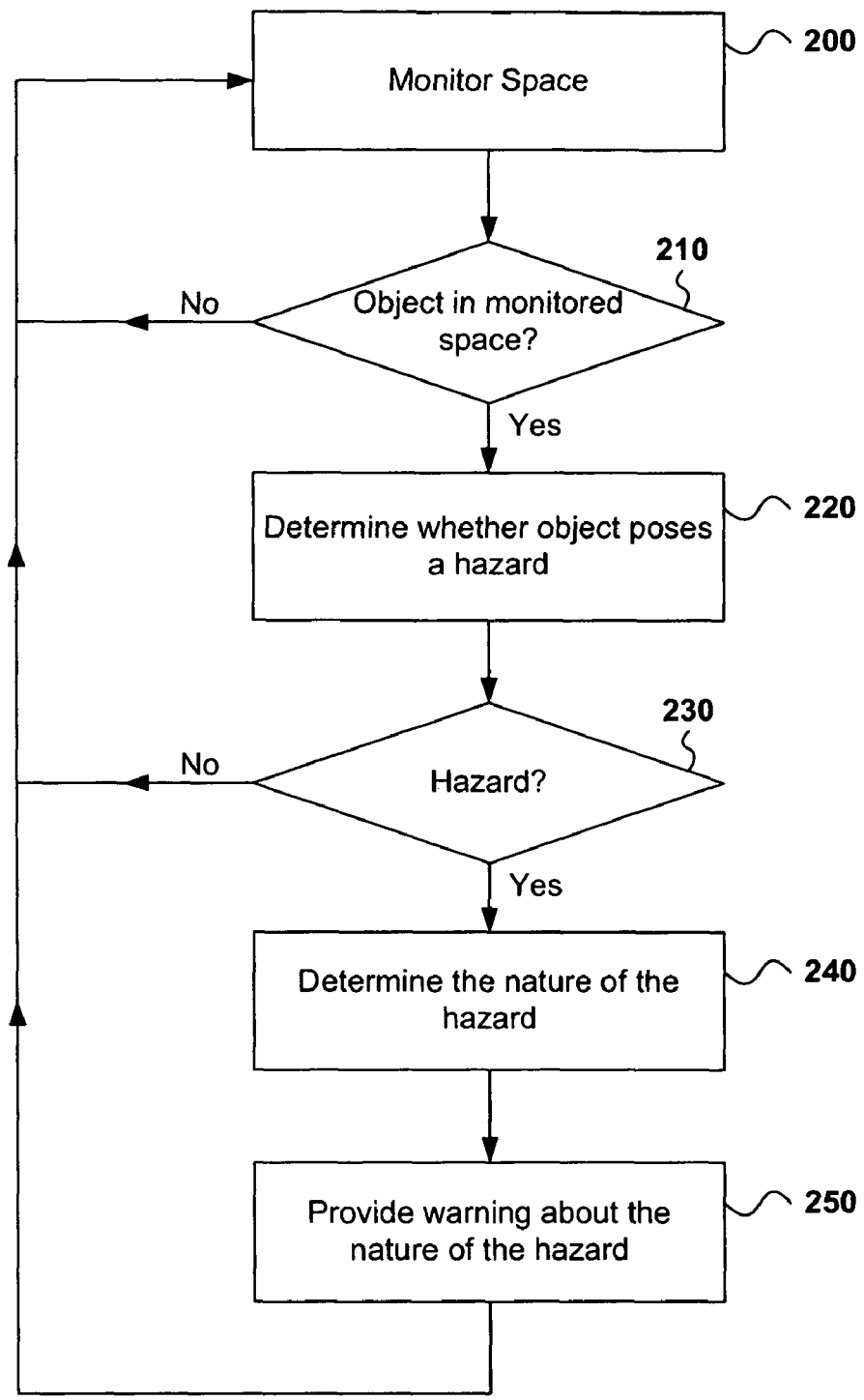
FIG. 2 is a flowchart showing operational aspects of an exemplary embodiment of the invention.

FIG. 2 shows operational aspects of an exemplary embodiment of the invention. The RFID tag reader 110 monitors the monitored space (block 200), awaiting the entry of an object bearing an RFID tag into the monitored space. Until an RFID tag enters the monitored space, the RFID tag reader continues to monitor (block 210, no).

Once an RFID tag has entered the monitored space (block 210, yes), and an object bearing the RFID tag has therefore entered the monitored space, a determination is made as to whether the object poses a hazard (block 220). The decision may be derived from categories, wherein, for example, forklifts are deemed to pose a hazard, but not people. This determination may be made by reading data from the RFID tag regarding the object or by accessing a database or other memory using identification data read from the RFID tag. The database may be stand-alone and dedicated to this purpose, or may be, for example, part of the back-end system 150 or part of another system component such as the RFID tag reader 110, the RFID edge controller 120, or the premises server 140.

If the object is determined not to pose a hazard (block 230, no), process flow returns to monitor the monitored space (block 200). Otherwise (i.e., the object is determined to pose a hazard; block 230, yes), the nature of the hazard is determined (block 240) in this embodiment of the invention. This may be accomplished substantially in the manner just described, for example by reading data from the RFID tag regarding the nature of the object or the hazard or by accessing a database using identification data read from the RFID tag. A warning is then provided about the nature of the hazard (block 250), and process flow returns to monitor the monitored space (block 200).

Figure 3:
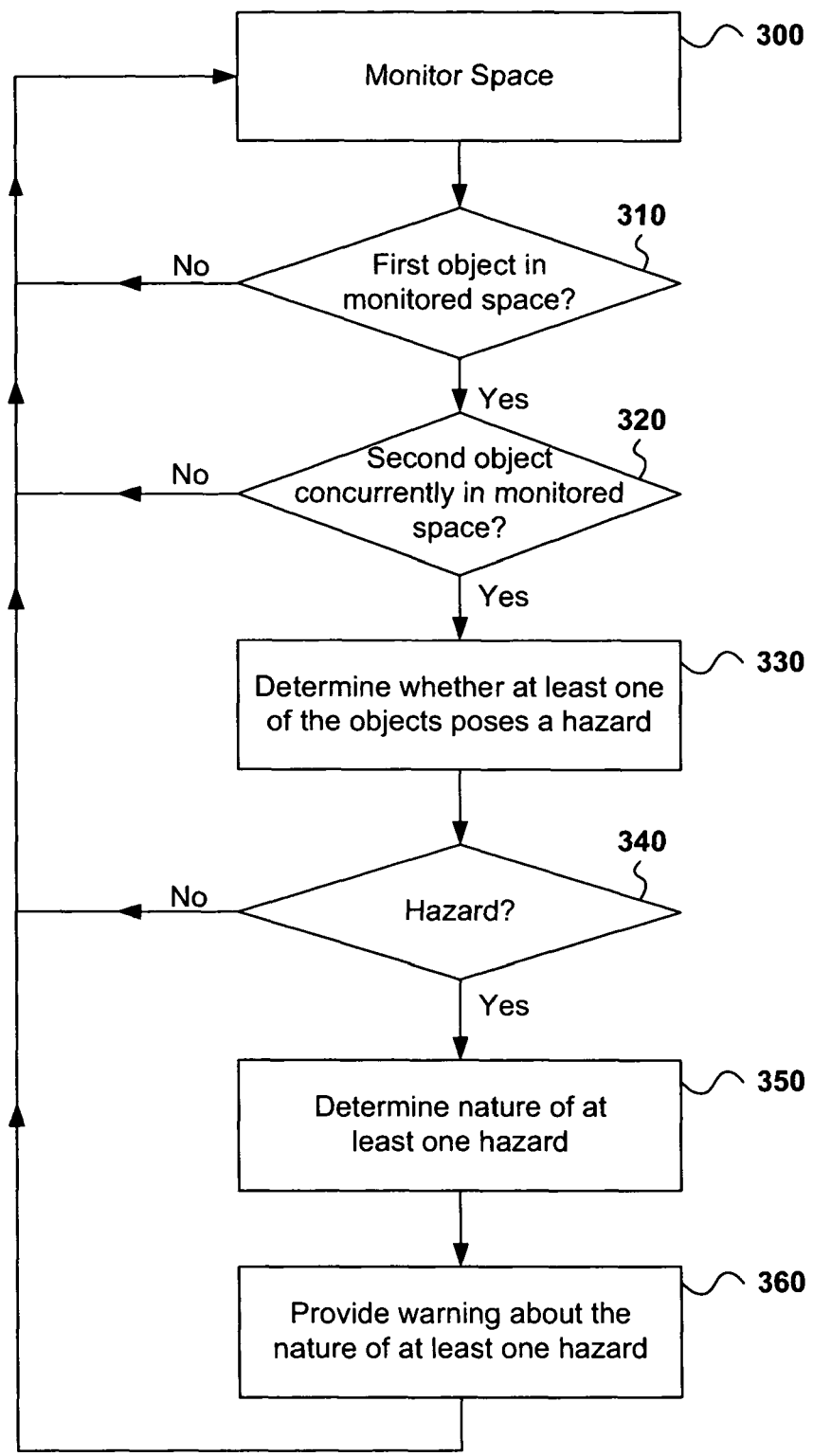
FIG. 3 is a flowchart showing operational aspects of another exemplary embodiment of the invention.

FIG. 3 shows operational aspects of another exemplary embodiment of the invention. In this embodiment, providing the warning may be conditional upon the concurrent presence of two objects in the monitored space, whereas in the embodiment just described with reference to FIG. 2, the warning may be provided upon the entry of a single object into the monitored space.

As shown in FIG. 3, the RFID tag reader 110 monitors the monitored space (block 300), awaiting the concurrent presence of two RFID tags in the monitored space (blocks 310, 320). When two RFID tags are concurrently present in the monitored space (block 320, yes), and therefore two objects bearing RFID tags are concurrently present in the monitored space, a determination is made as to whether at least one of the objects poses a hazard (block 330). For example, if both objects are people, the outcome of the determination may be that neither poses a hazard, and therefore no hazard is present, whereas if one or both of the objects is a forklift, the outcome may be that a hazard is present. Again, the determination may be based on data read from the RFID tags regarding the objects or based on data obtained by accessing a database using identification data read from the RFID tags, substantially as described above.

If it is determined that neither object poses a hazard (block 340, no), process flow returns to monitor the monitored space (block 300). Otherwise (i.e., at least one of the objects is determined to pose a hazard; block 340, yes), the nature of at least one of the hazards is determined (block 350). This may be accomplished by reading data from at least one of the RFID tags regarding the nature of the object or hazard or by accessing a database using identification data read from the RFID tag, substantially in the manner just described. A warning is then provided about the nature of at least one of the hazards (block 360), and process flow returns to monitor the monitored space (block 300).

It is important to note that, for the purpose of descriptive clarity, reference is made herein to an RFID tag affixed to, borne by, or otherwise associated with an object. Equivalently, a plurality of tags may be affixed to, or borne by, or otherwise associated with the object to convey the data relevant to this invention. For example, a given object may have one tag providing identification data, and another, separate, tag providing information about the nature of a hazard posed by the object. The invention encompasses such situations as well, and is not limited to the descriptive case wherein all of the data about an object is carried by a single RFID tag affixed to, borne by, or otherwise associated with that object.

Although the foregoing has described systems, methods, and computer program products for warning of hazardous conditions in monitored spaces, the description of the invention is illustrative rather than limiting, and the invention is limited only by the claims that follow.

We claim:

1. A method for warning of hazardous conditions, comprising:
    detecting concurrent presence in a monitored space of a first object bearing a first RFID tag and a second object bearing a second RFID tag;
    determining whether at least one of the objects poses a hazard using data read from at least one of the RFID tags; and
    if at least one of the objects is determined to pose a hazard, determining the nature of the hazard by accessing a database using information read from at least one of the RFID tags, and providing a warning proximate to the monitored space about the nature of the hazard.

2. The method of claim 1, wherein the first object and the second object belong to the group of objects consisting of human beings, vehicles, and stationary materiel.

* * * * *